United States Patent Office 3,250,679
Patented May 10, 1966

3,250,679
PENICILLIN DERIVATIVE
Alexander B. A. Jansen, Petersfield, and Trevor J. Russell, Bracklesham Bay, Sussex, England, assignors to American Home Products Corporation, New York, N.Y., a corporation of Delaware
No Drawing. Filed May 27, 1964, Ser. No. 370,687
Claims priority, application Great Britain, May 30, 1963, 21,750/63
3 Claims. (Cl. 167—65)

This invention relates to a new penicillin derivative, a process for preparing it, and pharmaceutical preparations containing it.

Free penicillins and their salts are generally less effective when taken orally than when administered parenterally, because of inactivation in the stomach and gut; higher doses are required to achieve the same blood levels, and there is a great variation in the ability of individuals to absorb penicillin into the blood by the oral route. Thus, benzyl penicillin (Penicillin G) is much less effective as an antibiotic agent when administered orally than when it is administered parenterally. Much research has in the past been directed to the discovery of penicillins which are less readily inactivated in the stomach and gut so that a relatively large part of the therapeutic agent administered orally can be absorbed into the blood. This has led to the development of some more highly orally-active penicillins, for example phenoxymethyl penicillin (Penicillin V), which is comparatively stable to hydrochloric acid in the stomach. Nevertheless, even with Penicillin V absorption is still erratic. Moreover, this antibiotic is less potent against many pathogenic bacteria than is benzyl penicillin.

When a penicillin arrives in the blood stream, whether by the oral or the parenteral route, some is broken down and the rest is excreted before inactivation. A dose of a sodium penicillin is normally completely eliminated from the body within a few hours of intramuscular injection. The concentration of the penicillin in the blood steadily decreases from its maximum level, and the penicillin may require replenishment by frequent repeated further administration in order to maintain a sufficient concentration until the presence of the therapeutic agent is no longer required. Accordingly research has in the past also been directed to the provision of long-acting preparations which release their penicillin content in such a way as to maintain a relatively high concentration of the therapeutic agent in the blood over a prolonged period. Thus, attempts have been made to solve this problem by means of penicillin salts or other derivatives from which the penicillin is chemically released in the body. As a result some long-acting injectable preparations have been developed, but no derivatives have hitherto been found which can be used orally to give a sustained high blood level of antibiotic. It has in practice proved extremely difficult to find derivatives which will break down to release the free penicillin where it is required if breakdown in the stomach is to be avoided. For example, many penicillin esters show no substantial therapeutic activity in man, as their hydrolysis to free penicillin in the body proceeds far too slowly.

The present invention is concerned with a new penicillin derivative which, although of no practical value for parenteral use, behaves on oral administration consistent with it being resistant to breakdown in the stomach but susceptible to break-down beyond the stomach and in such a way that free penicillin appears in the blood stream over a prolonged period. That these properties are remarkable is emphasized by the fact that of many closely related compounds which have been made and tested, it is the only one to possess these properties to a significant extent. The reason for this is obscure, but it may be that its chemical and physical properties, including size and shape of the molecule, uniquely fit the requirements for stability in the stomach and subsequent enzymic hydrolysis. The uniqueness of this behavior is shown by the fact that the properties are lost not only on variation of the nature of the derivative group but also on variation of the penicillin on which the derivative is based.

The penicillin derivative of the invention is acetoxymethyl benzylpenicillinate, having the structure:

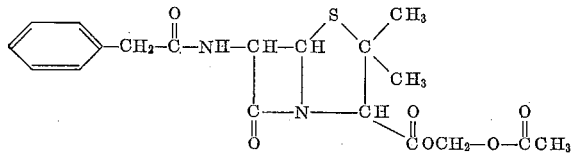

It is to be noted that because the compound of the invention is a derivative of Penicillin G, it has a much wider spectrum of antibiotic activity than such penicillins as Penicillin V which are particularly favored for their good oral absorption.

A process for preparing the penicillin derivative of the invention is one in which an acetoxymethyl halide is caused to condense with benzylpenicillin, which in practice is in the form of a salt. Suitable benzylpenicillin salts are alkali metal and amine salts, for example sodium, potassium, diethylamine, and triethylamine salts. The acetoxymethyl halide is preferably the bromide, but can also be the chloride. These acetoxymethyl halides can be prepared by the reaction of the corresponding acetyl halide with paraformaldehyde by heating the reagents together in the presence of anhydrous zinc chloride, and subsequently isolating the acetoxymethyl halide by distillation.

The preparation of the derivative of the invention is conveniently carried out by bringing the acetoxymethyl halide into contact with the penicillin salt in an inert solvent at a temperature within the range of from 0° to 30° C. A suitable solvent for the reaction is dimethylformamide, which, preferably, should be as dry as possible in order to avoid side-reactions with water which reduce the yield of product. After the reagents have been allowed sufficient time to react, the product is conveniently poured into water (preferably buffered at $pH_6$) and the precipitate of penicillin derivative filtered off. The derivative can then be taken up in a suitable organic solvent, for example chloroform or isopropyl alcohol, and isolated in crystalline form. As is well understood in the art of penicillin manufacture, the preparation of the therapeutic agent in crystalline form is important, and preferably the penicillin derivative of this invention is obtained in crystalline form, M.P. 106–8° C., $[\alpha]_D^{20} +154°$.

The pharmaceutical preparations of the invention are ones for oral use comprising acetoxymethyl benzylpenicillinate in association with a pharmaceutically acceptable carrier suitable for oral administration.

The pharmaceutically acceptable carrier can be either solid or liquid. Solid form preparations include powders, tablets, dispersible granules, capsules, troches and cachets. A solid carrier can be one or more substances which may also act as flavoring agents, solubilizers, lubricants, suspending agents, binders, or tablet-disintegrating agents; it can also be an encapsulating material. In powders, the carrier is a finely divided solid, which is in admixture with the finely divided compound. In tablets the compound is mixed with carrier having the necessary binding properties in suitable proportions and compacted in the shape and size desired. The powders and tablets preferably contain from about 5 to 99% of the active ingredient. Suitable solid carriers are magnesium carbonate, magnesium stearate, talc, sugar, lactose, pictin, dextrin, starch, gelatin, tragacanth, methyl cellulose, and sodium carboxymethyl cellulose. The term "preparation" is intended to include the formulation of the compound with encapsulating material as carrier, providing a capsule in which the compound (with or without other carriers) is surrounded by carrier, which is thus in association with it. Similarly, cachets are included. Liquid form preparations include solutions, suspensions, and emulsions. Aqueous suspensions suitable for oral use can be made by dispersing the finely divided compound in water with sodium carboxymethyl cellulose as suspending agent. Oily suspensions can be prepared by dispersing the finely-divided compound in arachis oil. The pharmaceutical preparation may also contain other active ingredients, for example, other penicillin antibiotics.

Preferably the pharmaceutical preparation is in unit dosage form. In such form, the preparation is subdivided in unit does containing appropriate quantities of the compound. The unit dosage form can be a packaged preparation, the package containing discrete quantities of preparation, for example, packeted powders. The unit dosage form can be a capsule, cachet or tablet itself, or it can be the appropriate number of any of these in packaged form. A unit dose of the preparation may contain between 40 and 1200 mg., and preferably from 150 to 800 mg., of the penicillin derivative of the invention.

The invention includes a product in which a penicillin derivative of the invention is brought into association with a pharmaceutically acceptable carrier to give a preparation of the invention. The penicillin derivative and products of the invention are useful in the curative or prophylactic treatment of mammals, especially human beings, suffering from, or liable to suffer from, infection by pathogenic bacteria sensitive to benzyl-penicillin, by orally administering to such a mammal a pharmaceutical preparation in accordance with the invention. In humans a unit dose need only be administered 3 or 4 times every 24 hours for the maintenance of effective concentrations of antibiotic in the blood, whereas the recommended frequency of dosage using potassium Penicillin V is once every 4 hours.

The invention is illustrated by the following examples, in which infrared absorption data (IR) refer to the positions of maxima given in cm.$^{-1}$.

*Example I*

A mixture of triethylammonium benzylpenicillinate (2.6 g., the triethylammonium salt of Penicillin G), bromomethyl acetate (4.5 cc.) and dimethylformamide (10 cc.) was shaken overnight at room temperature and then poured into water. The product was collected in chloroform, the solvent evaporated and the residue washed repeatedly with water by decantation, and then with petrol to yield a gum (2.05 g.) which crystallized from a mixture of isopropanol and ethanol as colorless prisms of acetoxymethyl benzylpenicillinate (1.82 g.), M.P. 105–6° C. after drying in vacuo; IR: 1782 ($\beta$-lactam), 1760 (ester CO). (Found: C, 56.1; H, 5.4; N, 6.8; S, 8.0. $C_{19}H_{22}N_2O_6S$ requires C, 56.15; H, 5.5; N, 6.9; S, 7.9%.)

*Example II*

Dimethylformamide (22 kg., containing less than 0.05% of water) and dry potassium benzylpenicillinate (10 kg.) were charged into a reaction vessel and cooled to 10° C.

Bromomethyl acetate (4.15 kg.) was added to the stirred solution over a period of 1 hour, while maintaining the temperature at below 15° C., and the stirring was continued for a further 6 hours at 10–15° C.

The reaction mixture was then added during 1 hour to a pH 6 buffer solution prepared from water (100 l.), potassium dihydrogen phosphate (280 g.) and dipotassium hydrogen phosphate (720 g.), the mixture being stirred vigorously and cooled to 5° C. After a further hour's stirring, the precipitated white solid was collected by filtration and washed with water (5 l.). The washed product was dissolved in boiling isopropyl alcohol (14 l.), the solution cooled to 15° C., and the recrystallized product collected and dried at 40–5° C. in vacuo to give acetoxymethyl benzyl-penicillinate (9.1 kg., 83% of theory), M.P. 106–8°; $[\alpha]_D^{20}+154°$ (1% in chloroform.)

*Example III*

Powdered acetoxymethyl benzylpenicillinate (250 parts by weight), maize starch (66 parts), purified wood cellulose powder (30 parts) and magnesium stearate (3 parts) are mixed together, the mixture passed through a 40 mesh British Standard sieve and slugged twice, granulated and passed through a 16 mesh British sieve. With the resulting granules there is mixed further magnesium stearate (1 part) and the mixture is then compressed in a tabletting machine, to give tablets of 350 mg. weight.

*Example IV*

Acetoxymethyl benzylpenicillinate is dissolved in polyethylene glycol of molecular weight 400 and the resulting solution diluted with the solvent in such a way that the final solution contains 100 mg./cc. of the penicillin derivative. A suitable unit dose of the resulting liquid preparation of the invention is 5 cc.

*Example V*

Solid crystalline acetoxymethyl benzylpenicillinate is filled into gelatin capsules in quantities of 360 mg. per capsule, to give a solid preparation of the invention with the gelatin acting as pharmaceutical carrier.

The advantages of the invention are further illustrated by the following test results.

*Example VI*

A blood sample of each of 8 dogs (beagles) was tested for control purposes to show it had no activity as assayed by the cup-plate method of penicillin bioassay using the organism *Sarcina lutea*.

Acetoxymethyl benzylpenicillinate was administered by mouth to the fasted dogs using capsular preparations similar to those described in Example V above, except that the amount of penicillin derivative in each capsule was varied in such a way as to give a unit dose in single capsule of 20 mg. of penicillin derivative per kg. of body weight to each dog.

After definite intervals a sample of each dog's blood was taken and the serum submitted to bioassay, the results being compared with those obtained using potassium Penicillin G by the cup-plate method as standard.

Similar tests were done under the same conditions using standard penicillins and four dogs to each penicillin. An average of the results for each compound was taken and is shown in the following Table A.

TABLE A

| Compound | Serum penicillin in μg./cc. Hours after oral administration | | | | | | |
|---|---|---|---|---|---|---|---|
| | 1 | 2 | 4 | 6 | 8 | 12 | 24 |
| Acetoxymethyl benzylpenicillinate | 0.90 | 0.71 | 0.36 | 0.11 | 0.05 | 0.01 | 0 |
| Potassium Penicillin G | 3.9 | 3.92 | 0.6 | 0.06 | 0 | 0 | 0 |
| Potassium Penicillin V | 0.83 | 0.56 | 0.11 | 0.05 | 0.02 | 0 | 0 |
| Benzathine Penicillin G | 0.32 | 0.28 | 0.03 | 0 | 0 | 0 | 0 |
| Phenethicillin | 1.11 | 0.7 | 0.14 | 0.02 | 0.02 | 0 | 0 |
| Phenbencillin | 0.90 | 0.75 | 0.06 | 0.02 | 0.02 | 0 | 0 |
| Ampicillin | 2.44 | 2.02 | 0.57 | 0.04 | 0.01 | 0 | 0 |

*Example VII*

The advantages shown by the compound in comparison with potassium Penicillin G in achieving prolonged high levels of antibiotic in various tissues after oral administration are illustrated by the following results in Table B in which four dogs (beagles) were administered the compounds by capsule containing 20 mg./kg. body weight, and after 6 hours the dogs were sacrificed and the penicillin tissue levels determined.

TABLE B

| | Penicillin in μg./g. wet weight | | | | | | | |
|---|---|---|---|---|---|---|---|---|
| | Spleen | Kidney | Liver | Lung | Heart | Skeletal muscle | Ileum | Bile |
| Acetoxymethyl benzyl penicillinate | 0.47 | 2.4 | 0.90 | 0.37 | 0.47 | 0.17 | 0.60 | 18.2 |
| Potassium Penicillin G | 0.03 | 0.75 | 0.50 | 0.23 | 0.07 | 0 | 0.23 | 15.3 |

*Example VIII*

The advantages shown by the compound of the invention as compared with a series of related compounds are demonstrated by results of further tests with dogs (beagles) carried out under the same conditions as those shown above, two dogs being used for each of these other penicillin derivatives. An average of the results for each compound was taken and is shown in the following Table C, in which the compounds are identified by reference to their basic penicillin and the derivative group attached to the penicillin acid group.

TABLE C

| Basic compounds and derivatives tested | Serum penicillin in μg./cc. Hours after oral administration | | | | | |
|---|---|---|---|---|---|---|
| | 1 | 2 | 4 | 6 | 8 | 24 |
| Benzyl penicillin (Penicillin G): | | | | | | |
|   Acetoxymethyl | 0.90 | 0.71 | 0.36 | 0.11 | 0.05 | 0 |
|   Propionoxymethyl | 0.16 | 0.19 | 0.04 | 0 | | |
|   Butyryloxymethyl | 0 | 0.13 | 0 | 0 | 0 | 0 |
|   n-Decanoyloxymethyl | 0.12 | 1.1 | 0.16 | 0.02 | | 0 |
|   Benzoyloxymethyl | 0 | | | 0 | | |
|   m-Chlorobenzoyloxymethyl | 0.06 | 0.12 | 0 | 0 | | 0 |
|   p-Chlorobenzoyloxymethyl | | 0.25 | 0.02 | 0 | | |
|   Methoxymethyl | 0.6 | | 0 | 0 | | |
| Phenoxymethyl penicillin (Penicillin V): | | | | | | |
|   Acetoxymethyl | | 0.06 | 0.05 | 0 | 0 | 0 |
|   Propionoxymethyl | 0.05 | 0 | 0 | | | |
| 2,6-Dimethoxybenzyl penicillin (Methicillin): | | | | | | |
|   Acetoxymethyl | 0 | 0 | 0 | 0 | | |
|   Benzoyloxymethyl | 0 | | | 0 | | |
| α-Phenoxyethyl penicillin (Phenethicillin): | | | | | | |
|   Acetoxymethyl | 0.06 | 0.04 | 0.02 | 0 | | |
|   Propionoxymethyl | 0 | 0 | 0 | 0 | | |
| α-Phenoxypropyl penicillin (Propicillin): | | | | | | |
|   Acetoxymethyl | 0.03 | 0.04 | 0 | 0 | | |
| α-Phenoxybenzyl penicillin (Phenbencillin): | | | | | | |
|   Acetoxymethyl | 0 | 0 | 0 | 0 | | |
| 3-o-Chlorophenyl-5-methyl-4-isoxazolyl penicillin (Cloxacillin): | | | | | | |
|   Acetoxymethyl | 0 | 0 | 0 | 0 | | |
|   Butyryloxymethyl | 0 | 0 | 0 | 0 | | |

The results demonstrate the initial high blood levels achieved with the compound of the invention and the prolonged maintenance of substantial levels, as compared with other related derivatives.

*Example IX*

The compound of the invention has been administered orally in a unit dose of 750 mg. to fasted human patients in the form of the preparation of Example II above. Blood samples were taken and submitted to penicillin bioassay before ingestion (as controls, showing no antibiotic activity) and at intervals up to 10 hours from administration. In a series of 16 patients, 14 achieved blood serum levels bioassayed as Penicillin G of over 1.0 μg./cc. during the 2 hours after administration, 14 had blood serum levels of over 0.1 μg./cc. after 6 hours or later, and all of 5 patients tested after 10 hours had blood serum levels of over 0.05 μg./cc.

We claim:
1. Acetoxymethyl benzylpenicillinate.
2. The method of preparing acetoxymethyl benzylpenicillinate which comprises: condensing an acetoxymethyl halide with a salt of benzylpenicillin selected from the group consisting of the alkali metal and amine salts thereof, in an inert solvent at a temperature within the range of from 0° to 30° C.
3. A pharmaceutical preparation in unit dosage form suitable for oral use and comprising a therapeutic amount of crystalline acetoxymethyl benzylpenicillinate and a pharmaceutically acceptable carrier.

No references cited.

HENRY R. JILES, *Acting Primary Examiner.*
JAMES W. ADAMS, JR., *Assistant Examiner.*